United States Patent [19]

Fritz et al.

[11] Patent Number: 4,609,382

[45] Date of Patent: Sep. 2, 1986

[54] SOLIDS CONCENTRATE WHICH CONTAINS ABRASIVE SOLIDS AND CAUSES LITTLE WEAR

[75] Inventors: Hans-Gerhard Fritz, Uhingen; Helmut Schüle; Eberhard Grünschloss, both of Stuttgart; Tomas Riedel, Biberach; Karl Maier, Augsburg, all of Fed. Rep. of Germany

[73] Assignee: Hoechst Aktiengesellschaft, Fed. Rep. of Germany

[21] Appl. No.: 699,006

[22] Filed: Feb. 7, 1985

[30] Foreign Application Priority Data

Feb. 11, 1984 [DE] Fed. Rep. of Germany ....... 3404859

[51] Int. Cl.$^4$ ............................................... C09K 3/14
[52] U.S. Cl. ...................................... 51/298; 51/295; 51/307; 51/308
[58] Field of Search ................ 51/295, 298, 309, 307; 523/351; 524/489, 407, 423, 425, 431, 451

[56] References Cited

U.S. PATENT DOCUMENTS

| | | | |
|---|---|---|---|
| 4,138,229 | 2/1979 | Tadokoro et al. | 51/295 |
| 4,225,321 | 9/1980 | Swiatek | 51/295 |
| 4,364,329 | 12/1982 | Murai et al. | 51/295 |
| 4,525,177 | 6/1985 | Grimes et al. | 51/295 |

*Primary Examiner*—Paul Lieberman
*Assistant Examiner*—Willie J. Thompson
*Attorney, Agent, or Firm*—Connolly and Hutz

[57] ABSTRACT

The wear on machine components is reduced during processing of solids concentrates containing abrasive solids if solids concentrates in which the carrier material has a resistance to shear and/or deformation which is the same as or higher than that of the polymer to be provided with the solids concentrate are employed.

8 Claims, No Drawings

SOLIDS CONCENTRATE WHICH CONTAINS ABRASIVE SOLIDS AND CAUSES LITTLE WEAR

The invention relates to a solids concentrate for coloring and filling or reinforcing thermoplastics, which contains abrasive solids and nevertheless causes little wear to the processing machines.

Pigment preparations which are designated a "masterbatch" and are in most cases granular are at present usually employed for coloring plastics, preferably thermoplastics, on single-screw and multi-screw extruders. Such preparations in general consist of inorganic and/or organic pigments, of the so-called carrier, which can in turn be composed of several substances, and, if appropriate, dispersion auxiliaries. Typical examples of such preparations which may be mentioned are the masterbatches currently commercially available for coloring polyethylene, the carrier materials of which consist of low density polyethylene (LDPE, melting temperature range $T=112°-115°$ C.) and/or waxy substances (for example polyethylene waxes with melting temperature ranges between 70° and about 120° C.), it being possible for the ratios in the mixture to vary within wide limits.

If such preparations contain very hard inorganic substances as pigments, for example metal oxides, such as $Cr_2O_3$ (green), $TiO_2$ (white) or $Fe_2O_3$ (brown), excessive signs of wear occur, in particular, in extruders with a grooved intake zone in the region where the solid is conveyed when amounts of 0.5 to 5% by weight, which are customary in practice, of masterbatch are added to the polymer base material to be colored. In the case of extruders with a smooth barrel, such wear, which in absolute terms is nevertheless somewhat less, preferentially appears at the beginning of the transition or compression zone. The abrasion to the screw and barrel, which consist of highly alloyed and nitratable steel (for example 34-CrAlNi7 or 31-CrMoV9) and have a surface hardness of $\geq 900$ HV 30 in the nitrated state, frequently advances so rapidly that replacement of these components is already necessary after 1,200–2,000 operating hours (=3–5 months) because of drastically impaired conveying properties. The economic importance of such losses can immediately be seen if, on the one hand, the reconstruction costs for such plants (replacement of screw and intake bush, reconstruction of the plasticizing barrel: DM 25,000 to 30,000, depending on the size of the extruder) are included when calculating the profitability and, on the other hand, it is known that the life of such extrusion systems can reliably be far in excess of 20,000 hours when non-abrasive mixtures are used.

It is furthermore known that high density polyethylene can be used as the sole carrier material for pigment concentrates (c.f. Japanese Preliminary Published Application Nos. 161,239 of 26.5.1982). However, such pigment concentrates do not give optimum distribution of the pigment in the polymer to be colored.

Finally, it is also known that a mixture of high density polyethylehe and a polyethylene wax with a melting point of 90° to 105° can be used (c.f. East German Pat. No. 153,605).

There was the object of providing a carrier material which can reduce the action of abrasive solids which causes wear.

It has been found that a carrier material which has particular deformation and plasticizing properties in comparison with the polymer to be colored or filled can achieve the object.

The invention thus relates to the solids concentrate described in the claims.

The solids concentrate according to the invention consists of at least one abrasive solid, a carrier material which has a resistance to shear and/or deformation which is the same as or higher than that of the polymer to be provided with the solids concentrate and, if appropriate, the usual additives required for processing and use.

Examples of abrasive solids which may be mentioned are the coloring pigments $Cr_2O_3$, $Fe_2O_3$, $TiO_2$ and Ti mixed oxides, and the carbonates, silicates, sulfates and oxides of calcium, magnesium, aluminum, silicon and barium which are used, above all, as fillers, such as, for example, chalk, aragonite, limestone flour, dolomite talc, silica and baryte. $Cr_2O_3$, $Fe_2O_3$, $TiO_2$ and chalk, talc and baryte are preferably used.

The amount of abrasive solid in the solids concentrate is 10 to 80% by weight, preferably 20 to 70 and in particular 30 to 60% by weight.

The carrier material consists of 0 to 99.5% by weight, preferably 30 to 98 and in particular 50 to 95% by weight, of at least one polymer which is compatible with the polymer to be colored or filled, i.e. high density polyethylene for high density polyethylene, low density polyethylene for low density polyethylene, polypropylene for polypropylene and polystyrene for polystyrene. The melting properties of the polymer in the carrier material should be similar to those of the polymer to be provided with, i.e. colored or filled with, the solids concentrate.

The carrier material moreover consists of at least one hard wax of high metting point. This wax can be a crystalline polyolefin wax or an amide wax. The polyolefin wax is built up in a predominantly linear manner and has a molecular weight of about 1,000 to 20,000, a melting point of about 120° to about 155° C. and a melt viscosity of 100 to 40,000 mPa.s at 140° C. in the case of a polyethylene wax and a melt viscosity of 1,000 to 40,000 mPa.s at 170° C. in the case of a polypropylene wax. Examples of such waxes are polyethylene waxes and polypropylene waxes which have been prepared by direct synthesis by the Ziegler process. These waxes are particularly preferably used.

Suitable amide waxes are derived from aliphatic carboxylic acids with 16 to 22 carbon atoms, preferably 16 to 18 carbon atoms, and diamines with 2 to 6 carbon atoms, preferably 2 carbon atoms. Ethylenedistearylamide (bisstearoylethylenediamine) is used in particular.

The amount of wax in the carrier material is 0.5 to 100% by weight, preferably 2 to 70 and in particular 5 to 50% by weight.

The amount of carrier material in the solids concentrate is 20 to 90% by weight, preferably 30 to 80 and in particular 30 to 70% by weight.

If appropriate, the solids concentrate can contain 0 to 50% by weight, preferably 2 to 20% by weight, of the usual additives customary for the processing and use of the concentrate. Examples of such additives are stabilizers, lubricants, such as low molecular weight waxes of low melting point, metal soaps, antioxidants, flameproofing agents, optical brighteners, antistatics and the like.

The carrier material preferably consists of at least one polyolefin of high or low density, such as polyethylene of high (=HDPE), medium (MDPE) or low (LDPE)

density or polypropylene, on the one hand and at least one hard wax of high melting point, on the other hand. A carrier material which consists of at least one high density polyolefin and at least one hard wax of high melting point is particularly preferred. The carrier material especially preferably consists of a mixture of high density polyethylene and at least one hard polyethylene wax of high melting point.

The solids concentrate according to the invention is in general prepared in the usual known manner, by introducing the constituents into the mixing unit simultaneously or successively, depending on the type and amount. Kneaders or extruders are suitable mixing units.

However, it is also possible to make a conventional concentrate containing abrasive solids cause less wear by covering the solids concentrate with a material which is to be used according to the invention and has a resistance to shear and/or deformation which is the same as or higher than that of the polymer to be colored or filled.

A complete single-layered or multi-layered covering can be achieved, for example, by passing coextruded strands through corrugated pairs of combined welding and cutting rollers which, while extending the outer layer, cause local welding thereof and separation of the individual cushion-shaped multi-layered granules thus formed. The covering material is preferably applied here in a coating thickness of between $s = 0.1$ R to $0.6$ R ($R$ = radius of the coextruded cylindrical granules). The covering layer ensures adequate resistance to deformation of the multi-layered granules and a certain heat-insulating function towards the conventional pigment preparation which is in the center of the granules and which at least partly melts at lower temperatures. The abrasive pigments are thereby released from the carrier material only at a point in the screw canal or at a time at which a sufficiently thick plasticized film of plastic to be colored which immediately takes up the pigment exists.

These pigment concentrates which lead to a noticeable reduction in wear are thus also suitable for processing on screw systems which do not have particular mixing and shearing components.

The solids concentrates according to the invention cause substantially less wear to those components of the processing machines which are susceptible to wear, when these concentrates are added to the polymers to be filled or colored.

The thin layer difference method (TLDM), a wear measurement method of the radionuclide technique, has been used for direct measurement of the wear. In this method, depending on the aim of the investigation, a reference surface in the main region of wear on the screw base of an extruder with a grooved bush is activated down to a depth of 30 to 80 $\mu$m by bombardment with deutrons and neutrons. If necessary, the inner surface of the grooved bush or the flight lands are to be activated in the same manner. The pulse rate released by the measurement isotope $^{56}$Co (= $\gamma$-emitter), which is present in almost pure form after a decay time of about 3 weeks, decreases linearly with the depth of activation. The pulse rates, i.e. the radioactivity emitted per unit time, and the associated duration of the experiment were recorded, as measurement values, and printed out by means of a NaI scintillation counter. Taking into consideration the half-life of the measurement isotope, it was possible to convert any individual measurement point to the time of the start of the experiment and to determine it as a function of the duration of the experiment, taking into account the calibration values. The rate of wear $W_t$ ($\mu$m/hour) or $W_m = 100 \times W_t/m$ ($\mu$m/100 kg) was obtained by linear regression from the continuously measured pair of values decrease in level/duration of the experiment.

Since the thin layer difference method is very expensive, another indirect measurement method was developed. It is based on the observation that when solids concentrate particles according to the invention are incorporated into polymers, they exhibit a greater resistance than conventional solids concentrates to crushing by the rotating extruder screw and crushing between granules as a result of the process of compacting and pressure build-up.

A customary yield strength measuring instrument in which a punch with a cross-section of 0.5 cm$^2$ was employed was used for the measurement. The test mixtures were pressed to sheets (4×4 cm) 1.8 mm thick at 180° C. Test pieces 7 mm in diameter were stamped out of the sheets, and were tested at room temperature or elevated temperature, the pressure when the punch was positioned at half the height of the test piece (=0.9 mm) being measured ("crushing strength").

It has been found that carrier materials which cause the least wear had the highest crushing strength and vice versa. This method has the advantage that it already gives comparable values with the pure carrier materials, i.e. in the absence of the mineral solids.

EXAMPLE 1

Commercially available low pressure polyethylene (density: 0.958–0.961 g/cm$^3$, MFI 190/5 = 1.5 g/10 minutes) was mixed with in each case 1.0% by weight of granular mixture I or III and the mixture was extruded by means of a single-screw extruder (70 mm $\phi$/L=20 D) with a grooved intake zone with a temperature program from the heating zone boundary to the die of $Tz_1 = 200°$ C., $Tz_2-Tz_d = 230°$ C. The local wear caused by the mixtures of plastics was measured continuously over an experimental period of about 3 hours, and an axial wear profile typical of each mixture of plastic was thus determined in the solids zone. The wear values thus obtained relate to metallic erosion of material from the screw surface in $\mu$m/hour or $\mu$m/100 kg of throughput. The results are summarized in the following Table 1.

TABLE 1

|  | Mixture I commercially available | Mixture III |
|---|---|---|
| Pigment: | 50% by weight of chromium oxide (Cr$_2$O$_3$) | 50% by weight of chromium oxide (Cr$_2$O$_3$) |
| Carrier material: | 20% by weight of wax (melting point 72° C.) 30% by weight of LDPE Density 0.923–0.925 g/cm$^3$ MFI 190/2.16 = 1.3–1.8 g/10 minutes | 50% by weight of HDPE Density 0.962 g/cm$^3$ MFI 190/2.16 8 g/10 minutes |
| Wear measured: | $W_t = 1.24$ $\mu$m/hour $W_m = 2.5$ $\mu$m/100 Kg | $W_t = 0.03$ $\mu$m/hour $W_m = 0.06$ $\mu$m/100 kg |

Reduction in wear: factor of 40

Optimum division of the pigment in the preparation process and distribution of the pigment in the processing operation, however, are also not achieved with mixture III.

EXAMPLE 2

The wear test of Example 1 was repeated with the mixtures I to III listed in the following table. At the same time, 4×4 cm pressed sheets (1.8 mm thick) were produced from the mixtures at 180° C. Test pieces ($\phi$ 7 mm) were stamped out of the sheets and tested at room temperature in a yield strength test instrument with a punch with a cross-section of 0.5 cm$^2$ ("crushing strength").

TABLE 2

|  | III % by weight | II % by weight | I % by weight |
|---|---|---|---|
| Chromium oxide | 50 | 50 | 50 |
| HDPE (density 0.962 g/cm$^3$, MFI 190/2.16 8 g/10 minutes | 50 | — | — |
| LDPE (density 0.923-0.925 g/cm$^3$, MFI 190/2.16 33-39 g/10 minutes) | — | — | — |
| LDPE (density 0.917-0.920 g/cm$^3$ MFI 190/2.16 1.3-1.8 g/10 minutes) | — | 50 | 30 |
| Polyethylene wax (molecular weight about 2,000, Dp 103 to 108° C. (drop point) | — | — | 20 |
| Screw wear ($\mu$m/h) | 0.07 | 0.8 | 1.24 |
| Crushing strength (bar) at 20° C. | 430 | 210 | 170 |

EXAMPLE 3

The crushing strength test of Example 2 was repeated on pigment-free mixtures, but the test pieces were first heated at 85° C. for 10 minutes. The following materials were used:

A. LDPE (density 0.915-0.918, MFI 190/2.16 17 to 25 g/10 minutes)
B. HDPE (density 0.96 g/cm$^3$, MFI 190/5 1.5 g/10 minutes)
C. Polyethylene wax (molecular weight about 2,000, Dp 118° to 123° C.)
D. Polyethylene wax (molecular weight about 3,000, Dp 122° to 127° C.)
E. Polyethylene wax (molecular weight about 9,000, Dp about 140° C.)
F. Polyethylene wax molecular weight about 2,000, Dp 103° to 108° C.
G. fully refined paraffin wax, Dp 58/60° C.

In addition, pigment concentrates (50/50) were prepared from some carrier materials and Cr$_2$O$_3$ and these were admixed to a HD polyethylene (=material B) in an amount of 1% by weight. On extrusion, the degree of wear was determined by means of the TLDM.

The composition of the mixtures and the results of the experiments are summarized in Table 3.

TABLE 3

| Carrier material (% by weight) | 50% of carrier material/ 50% of Cr$_2$O$_3$ | | |
|---|---|---|---|
|  | Crushing strength (bar) | Degree of wear ($\mu$m/100 kg) | Pigment distribution in the polymer |
| 100 A | 80 | | |
| 80 A + 20 C | 80 | | |
| 60 A + 40 C | 65 | | |
| 80 A + 20 F | 60 | | |
| 60 A + 40 F | 55 | | |
| 60 A + 30 F + 10 G | 25 | | |
| 60 A + 30 C + 10 G | 45 | | |
| 80 A + 20 D | 120 | | |
| 60 A + 40 D | 145 | 1.18 | |
| 100 B | 310 | | |
| 80 B + 20 C | 230 | | |
| 60 B + 40 C | 150 | | |
| 80 B + 20 D | 295 | | |
| 60 B + 40 D | 250 | 0.05 | good |
| 80 B + 20 E | 290 | | |
| 60 B + 40 E | 295 | | |
| Mixture I | 80 | 2.48 | good |
| Mixture II | 120 | 1.60 | |
| Mixture III | 300 | 0.034 | poor |

EXAMPLE 4

A commercially available pigment concentrate (mixture I, cylindrical granules) was coated with an HDPE on a coextrusion unit in a known manner such that the front faces of the cylinders of the granules remain free (mixture IV). An amount of both the mixtures was introduced into an HDPE such that the amounts of pigment were comparable. On extrusion of the covered pigment concentrate, the wear was measured by means of the TLDM.

The nature and amount of the starting substances and the results of the experiment are summarized in Table 4.

TABLE 4

|  | Mixture I Pigment concentrate according to the prior art (cylindrical granules) | Mixture IV Mixture I with a covering layer: front faces open. (Cylindrical granules) |
|---|---|---|
| Amount of concentrate | 1.0% by weight | 1.73% by weight |
| Pigment | 50% by weight of chromium oxide (Cr$_2$O$_3$) | 29% by weight of chromium oxide (Cr$_2$O$_3$) |
| Carrier material | 20% by weight of wax (melting point 72° C.) 30% by weight of LDPE Density 0.917-0.920 g/cm$^3$ MFI 190/2.16 1.3-1.8 g/10 minutes | 11.5% by weight of wax (melting point 72° C.) 17.3% by weight of LDPE Density 0.917-0.920 g/cm$^3$ MFI 190/2.16 1.3-1.8 g/10 minutes |
| Covering layer | — | 42.2% by weight of HDPE Density 0.96 g/cm$^3$ MFI 190/5 1.5 g/10 minutes |
| Base material to be colored | HDPE Density 0.96 g/cm$^3$ MFI 190/5 1.5 g/10 minutes Cubed granules | HDPE Density 0.96 g/cm$^3$ MFI 190/5 1.5 g/10 minutes Cubed granules |
| Wear measured | $W_t = 1.24$ $\mu$m/hour $W_m = 2.5$ $\mu$m/100 kg | $W_t = 0.20$ $\mu$m/hour $W_m = 0.40$ $\mu$m/100 kg |
| Reduction in |  | Factor of 6 |

TABLE 4-continued

|  | Mixture I<br>Pigment concentrate according to the prior art (cylindrical granules) | Mixture IV<br>Mixture I with a covering layer: front faces open. (Cylindrical granules) |
|---|---|---|
| wear | | |

What is claimed is:

1. A solids concentrate for filling or coloring of polymers consisting essentially of 10 to 80% by weight of at least one abrasive solid, 20 to 90% by weight of a carrier material and 0 to 50% by weight of an additive required for processing and use, wherein the carrier material consists essentially of 0 to 99.5% by weight of at least one polymer which is compatible with the polymer which is to be provided with the solids concentrate and 0.5 to 100% by weight of at least one crystalline polyolefin wax having a molecular weight of about 1.000 to 20.000 and a melting point of about 120° to about 155° C. or an amide wax derived from aliphatic carboxylic acids with 16 to 22 carbon atoms and diamines with 2 to 6 carbon atoms whereby the carrier material has a resistance to shear or to deformation or both at least as high as that of the polymer to be provided with the solids concentrate.

2. A solids concentrate for filling or coloring of polymers consisting essentially of 10 to 80% by weight of at least one abrasive solid, 20 to 90% by weight of a carrier material and 0 and 50% by weight of an additive required for processing and use, wherein the carrier material consists essentially of 0 to 99.5% by weight of at least one polyolefin and 0.5 to 100% by weight of at least one crystalline polyolefin wax having a molecular weight of about 1.000 to 20.000 and a melting point of about 120° to about 155° C. or an amide wax derived from aliphatic carboxylic acids with 16 to 22 carbon atoms and diamines with 2 to 6 carbon atoms, whereby the carrier material has a resistance to shear or to deformation or both at least as high as that of the polymer to be provided with the solids concentrate.

3. A solids concentrate as claimed in claim 2, wherein the polyolefin is a high density polyolefin.

4. A solids concentrate as claimed in claim 3, wherein the carrier material consists essentially of a mixture of high density polyethylene and at least one hard polyethylene wax of high melting point.

5. A solids concentrate as claimed in claim 1, wherein the abrasive solid is $Cr_2O_3$, $Fe_2O_3$, $TiO_2$, chalk, talc or baryte.

6. A solids concentrate as claimed in claim 1, in which a concentrate containing conventional abrasive solids has a single-layered or multi-layered covering of a material which has a resistance to shear and/or deformation which is the same as or higher than that of the polymer containing the solids concentrate.

7. A method of reducing wear on machines during processing of a solids concentrate containing abrasive solids which comprises using a solids concentrate as claimed in claim 1.

8. A method of coloring or filling polymers involving use of a solids concentrate wherein the solids concentrate thus used is said solids concentrate of claim 1.

* * * * *